US012649517B2

(12) United States Patent    (10) Patent No.:    US 12,649,517 B2
Strecker                         (45) Date of Patent:       Jun. 9, 2026

(54) METHOD FOR OPERATING A STEERING SYSTEM OF A VEHICLE

(71) Applicant: Robert Bosch GmbH, Stuttgart (DE)

(72) Inventor: Joerg Strecker, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 18/841,264

(22) PCT Filed: Jan. 26, 2023

(86) PCT No.: PCT/EP2023/051853
§ 371 (c)(1),
(2) Date: Aug. 23, 2024

(87) PCT Pub. No.: WO2023/174606
PCT Pub. Date: Sep. 21, 2023

(65) Prior Publication Data
US 2025/0162647 A1      May 22, 2025

(30) Foreign Application Priority Data
Mar. 14, 2022    (DE) ..................... 10 2022 202 479.6

(51) Int. Cl.
*B62D 6/00*        (2006.01)
*B62D 5/00*        (2006.01)
(52) U.S. Cl.
CPC ............. *B62D 6/008* (2013.01); *B62D 5/003* (2013.01)
(58) Field of Classification Search
CPC ........ B62D 6/008; B62D 5/003; B62D 5/005; B62D 5/006; B62D 5/0484
(Continued)

(56) References Cited

U.S. PATENT DOCUMENTS 10,946,894 B2 *    3/2021    Pramod ................ B62D 5/0487

FOREIGN PATENT DOCUMENTS

DE        100 21 814 B4      9/2006
DE      10 2016 009 684 A1    2/2018
(Continued)

OTHER PUBLICATIONS

International Search Report corresponding to PCT Application No. PCT/EP2023/051853, mailed Apr. 21, 2023. (German and English language document). (6 pages).

*Primary Examiner* — Hai H Huynh
(74) *Attorney, Agent, or Firm* — Maginot, Moore & Beck LLP

(57)            ABSTRACT

The disclosure relates to a method for operating a steering system of a vehicle, in particular a motor vehicle, in which the steering system is designed as a steer-by-wire steering system having an at least partially fail-operational operating unit with at least one steering handle and with at least one feedback actuator that interacts with the steering handle, and having at least one wheel steering angle control element, which is operatively connected to the operating unit, for changing a steering angle of at least one vehicle wheel. The method includes changing a steering characteristic of the steering system in at least one operating state in which an initial error of the operating unit is ascertained, and modifying a steering feel in a controlled manner, in particular by means of a feedback actuator operation that is adapted to the initial error.

15 Claims, 2 Drawing Sheets

(58) Field of Classification Search
USPC ........................................ 701/41, 42, 43, 44
See application file for complete search history.

(56)                    References Cited

FOREIGN PATENT DOCUMENTS

DE      10 2018 125 667 A1     4/2019
DE      10 2018 222 442 A1     6/2020
DE      10 2019 216 282 A1     6/2020
DE      10 2019 105 922 A1     9/2020
WO         2019/134795 A1      7/2019

* cited by examiner

METHOD FOR OPERATING A STEERING SYSTEM OF A VEHICLE

This application is a 35 U.S.C. § 371 National Stage Application of PCT/EP2023/051853, filed on Jan. 26, 2023 which claims the benefit of priority to Serial No. DE 10 2022 202 479.6, filed on Mar. 14, 2022 in Germany, the disclosure of which is incorporated herein by reference in its entirety.

BACKGROUND

The disclosure relates to a method for operating a steering system of a vehicle. In addition, the disclosure relates to a computing unit for carrying out such a method, a steering system with such a computing unit and a vehicle with such a steering system.

Vehicles with conventional steering systems are known from the prior art, in which a steering handle, for example in the form of a steering wheel, is mechanically connected to a wheel steering angle control element in the form of a steering gear via a steering column. Vehicles with steer-by-wire steering systems are also known, which do not require a direct mechanical connection between a steering handle and the steered vehicle wheels and in which a driver setpoint and/or steering input is transmitted exclusively electrically. A steer-by-wire steering system of this type usually comprises an operating unit with a steering handle and a feedback actuator as well as at least one wheel steering angle control element that is mechanically separate from the operating unit and can be designed as a central regulator or as an single-wheel controller, for example.

Furthermore, such steer-by-wire steering systems are always designed redundantly for reasons of operational safety. With regard to the operating unit, one possibility is to design the operating unit to be fail-safe or fail-operational. In addition, the operating unit can also be designed to be fail-operational with regard to detecting a driver setpoint and fail-safe with regard to a feedback torque provided by the feedback actuator. With a corresponding design of the operating unit, a malfunction and/or failure of the feedback actuator due to the sudden loss of the feedback torque can lead to unintentional steering movements at the steering handle, which are interpreted by the steering system as a driver setpoint and/or steering input and can consequently lead to an undesired reaction of the vehicle. Possible methods for handling such errors can be found, for example, in DE 10 2016 009 684 A1 and DE 10 2018 222 442 A1.

Based on this, the disclosure provides a method with improved properties with regard to a mode of operation.

SUMMARY

The disclosure relates to a method for operating a steering system of a vehicle, in particular a motor vehicle, wherein the steering system is designed as a steer-by-wire steering system and comprises an operating unit with at least one steering handle and with at least one feedback actuator that interacts with the steering handle, and at least one wheel steering angle control element, which is operatively connected to the operating unit, for changing a steering angle of at least one vehicle wheel, wherein the operating unit is at least partially fail-operational, and wherein, a steering characteristic of the steering system is changed in at least one operating state in which an initial error of the operating unit is ascertained, in that a steering feel is modified in a controlled manner, in particular by means of a feedback actuator operation that is adapted to the initial error. The operating state in which the initial error is determined therefore corresponds in particular to an error operating state. Furthermore, the steering characteristics are changed by modifying the steering feel, in particular such that a feedback torque adapted to the initial error is provided and/or achieved in the operating state, whereby a driver is prepared and/or conditioned for a possible malfunction and/or a possible failure of the feedback actuator and can adapt said driver's general driving strategy and/or drive or steer more prudently. In particular, this design can improve functionality, wherein the controllability and/or manageability of the vehicle can be advantageously improved in the event of a fault or if the active feedback torque of the feedback actuator is omitted. In addition, an advantageously adaptive and/or variable method can be provided in which the steering characteristics can be flexibly adapted to current operating conditions. In addition, advantageous maneuverability of the vehicle can be achieved and operational safety increased.

In the present case, the steering system is designed as a steer-by-wire steering system, in which a driver setpoint and/or steering input, in particular from a driver, is advantageously transmitted to the vehicle wheels purely electrically. For this purpose, the steer-by-wire steering system comprises the, in particular redundantly designed, operating unit and at least one wheel steering angle control element that is mechanically separate from the operating unit and, in particular, redundantly designed. The term "wheel steering angle control element" is to be understood as an actuator unit coupled to at least one vehicle wheel, which is intended to transmit a driver setpoint and/or steering input, in particular of a driver, to the vehicle wheel by changing a wheel steering angle of at least one vehicle wheel and thereby advantageously control at least one alignment of the vehicle wheel and/or influence a direction of travel of the vehicle. To this end, the wheel steering angle control element advantageously comprises at least one steering regulator element, for example in the form of a gear rack, and at least one steering actuator, for example in the form of an electric motor, which is operatively connected to the steering regulator element. The wheel steering angle control element can be designed as a central regulator and be assigned to at least two vehicle wheels, in particular steerable and preferably designed as front wheels. Alternatively, however, the wheel steering angle control element can also be designed as an single-wheel controller and assigned to exactly one vehicle wheel, in particular a steerable wheel, preferably designed as a front wheel. Furthermore, a "feedback actuator" is to be understood as an actuator unit, in particular different from the wheel steering angle control element and in particular directly mechanically connected to the steering handle, which is intended to detect signals, forces and/or torques from the steering handle, in particular directly, and/or to transmit them to the steering handle, in particular directly. In the present case, the feedback actuator is provided in a normal operating state at least to provide an active feedback torque and thereby to generate a steering resistance and/or a restoring torque on the steering handle. Furthermore, the feedback actuator is intended in this context to adjust a steering feel that can be perceived in particular via the steering handle. For this purpose, the feedback actuator can comprise at least one further electric motor. By "at least partially fail-operational" is to be understood in particular fail-operational or operationally safe with regard to an initial error. In particular, preferably by means of the feedback actuator, a feedback torque can in this case continue to be applied to the steering handle after the initial error, wherein the feedback torque can, however, deviate from a feedback torque in the normal operating state. Thus, the initial error in this context does not immediately lead to a malfunction and/or failure of the operating unit and/or the feedback actuator. In principle, however, a second error, in particular following the initial error, can lead to a malfunction and/or failure of the operating unit and/or the feedback actuator. In particular, "a malfunction and/or failure of the operating unit and/or the feedback actuator" is to be understood as a malfunction and/or failure of the operating unit and/or the feedback actuator itself and/or of a peripheral module that interacts with the operating unit and/or the feedback actuator, such as a power supply, and a malfunction of the operating unit and/or the feedback actuator caused thereby. Furthermore, the wheel steering angle is basically equivalent to other variables between the steering actuator and the vehicle wheel, such as a deflection of the steering regulator element and/or a deflection position of the wheel steering angle control element and/or a motor movement. The same applies to a deflection of the steering handle, which is equivalent to other variables between the steering handle and the feedback actuator, such as a steering column angle and/or a motor angle. For the torque values on the vehicle wheel and on the steering handle, the same equivalence of variables applies between the vehicle wheel/steering handle and the respective connected actuator.

Furthermore, the vehicle and preferably the steering system comprise at least one computing unit, which is intended to carry out the method for operating the steering system. The term "computing unit" is intended to mean an electrical and/or electronic unit which has an information input, an information processor, and an information output. Advantageously, the computing unit also has at least one processor, at least one operating memory, at least one input means and/or output means, at least one operating program, at least one control routine and/or regulation routine, at least one calculation routine, at least one determination routine, at least one evaluation routine and/or at least one adaptation routine. In particular, the computing unit in the present case comprises at least one monitoring function for monitoring an operation of the operating unit and/or the feedback actuator. Furthermore, the computing unit is intended in particular to monitor and evaluate an operation of the operating unit and/or the feedback actuator by means of the monitoring function, in particular to determine an initial error of the operating unit. In addition, the computing unit is intended to change a steering characteristic of the steering system in at least one operating state in which an initial error of the operating unit is determined and, for this purpose, to modify a steering feel in a controlled manner, in particular by means of a feedback actuator operation that is adapted to the initial error. In this context, the computing unit can be provided in particular to use an error signal provided by the monitoring function to adjust the steering characteristics. Preferably, the computing unit is in this case preferably integrated into a control device of the vehicle, e.g., a central vehicle control device, or preferably a control device of the steering system, in particular in the form of a steering control device. In this context, "steering feel" is to be understood in particular as haptic feedback from the steering system to the driver that can be perceived via the steering handle, in particular in the form of a feedback torque. In particular, the feedback actuator is operated in a normal operating state, especially in an error-free state, such that a normal steering feel is generated and provided at the steering handle. In addition, the feedback actuator is operated in the operating state in which, in particular, the initial error is determined such that a modified steering feel is generated and provided at the steering handle. Accordingly, to change the steering characteristics in the operating state by adjusting the feedback torque, a change is preferably made from a normal steering feel to a modified steering feel. The term "intended" is in particular understood to mean specifically programmed, designed, and/or equipped. The phrase "an object being intended for a specific function" is particularly intended to mean that the object fulfills and/or performs this specific function in at least one application state and/or operating state.

According to a particularly preferred embodiment, it is proposed that the feedback actuator is operated in the operating state, in particular to change the steering characteristics, such that a change, in particular from the normal steering feel, to the modified steering feel takes place by means of a cross-fading and in particular using a moving average. For this purpose, a fade factor is defined which initially has the value 0 and at the end of the cross-fading or the fade phase has the value 1. An actual steering feel is then obtained during the cross-fading or fade phase by superimposing normal steering feel and modified steering feel and taking the fade factor into account. Preferably, the duration of the cross-fading can also be varied as a function of an, in particular additional amplification factor. In addition, cross-fading is preferably carried out on the basis of a torsion bar signal, particularly preferably a torsion bar torque, and/or a steering torque signal. The steering torque signal is equivalent to other variables, such as a motor torque of the feedback actuator and/or another operating signal of the operating unit. This enables a particularly harmonious transition from the normal steering feel to the modified steering feel. In addition, driving and/or steering behavior can be gradually adapted to a possible second error.

A particularly simple implementation of cross-fading in terms of software can be achieved in particular if an integrator is used for cross-fading. In particular, the computing unit can comprise the integrator. Preferably, an integrator value of the integrator in this context is dependent on the torsion bar signal, advantageously the torsion bar torque, and/or the steering torque signal, wherein the integrator value only increases when the torsion bar signal and/or steering torque signal exceeds a defined threshold value. In addition, the integrator can be activated in the operating state by an error signal correlated with the initial error and preferably provided by the monitoring function and/or enabled by an enable signal. Preferably, the integrator is only activated in this context when an initial error of the operating unit is ascertained. The integrator is therefore preferably deactivated in the normal operating state, which can advantageously reduce resource requirements. In addition, the integrator can initially be disabled after activation so that an additional enabling must be provided by the enable signal.

In principle, the duration of the cross-fading can assume any value or values depending on the driving situation. However, it is preferably proposed that a duration of the cross-fading is at least 10 s, preferably at least 15 s and particularly preferably at least 25 s. This allows a particularly smooth cross-fading to be achieved.

Furthermore, it is proposed that the modified steering feel provides feedback to a driver which is at least temporarily between the normal steering feel, in particular in the normal operating state, and a passive steering feel without active feedback torque by the feedback actuator, i.e. preferably a purely mechanical behavior. In particular, the modified steering feel can deviate significantly from the normal steering feel and significantly from the passive steering feel.

This can advantageously provide and/or achieve a steering behavior adapted to the initial error, which instinctively prepares and/or conditions a driver for a possible malfunction and/or a possible failure of the feedback actuator.

It is also preferably proposed that the modified steering feel has a characteristic which corresponds to the passive steering feel, in particular is similar and/or modeled on it. In addition, a visual or acoustic warning can be issued as a result of an initial error. This can achieve an advantageous warning and/or indication effect.

According to a particularly preferred embodiment, it is proposed that the modified steering feel emulates a characteristic corresponding to an inherent friction behavior of the operating unit, in particular a mechanism of the operating unit. In this way, in particular, a steering feel similar or analogous to the passive steering feel can be reproduced or simulated.

In addition, the modified steering feel could emulate a centering of the steering handle, which can increase the similarity of the modified steering feel to the normal steering feel. According to a preferred embodiment of the disclosure, however, it is proposed that the modified steering feel does not simulate a centering of the steering handle. This can instinctively signal to a driver that a function of the steering system is restricted and inform the driver that they should adapt their general driving strategy and/or drive or steer more carefully.

It is further proposed that a maximum torque level of the modified steering feel is above a maximum torque level of the passive steering feel. In principle, the maximum torque level of the modified steering feel is also below a maximum torque level of the normal steering feel. However, the maximum torque level of the modified steering feel can also be above the maximum torque level of the normal steering feel, at least temporarily or in certain driving situations, depending on the corresponding application. This can increase operational safety in the operating state, particularly in comparison to a complete failure of the feedback actuator. In addition, increased driving comfort and/or steering comfort can be achieved.

Furthermore, it is proposed that the modified steering feel simulates a non-linear or linear damping behavior, in particular of the operating unit, whereby safety and/or driving comfort and/or steering comfort can be increased. Preferably, the damping behavior is adapted as a function of a steering speed of the steering handle and/or a vehicle speed. Particularly advantageously, for example, the damping can be increased as the steering speed increases, for example such that damping only takes effect if the driver steers (too) quickly. Alternatively, however, the damping behavior could also simulate a damping behavior of the operating unit in the normal operating state, whereby a similarity of the modified steering feel to the normal steering feel can be increased.

The method for operating the steering system is not intended to be limited to the application and embodiment described hereinabove. In particular, the method for operating the steering system in order to achieve the functioning described herein can comprise a number of individual elements, components, and units that differs from the number specified herein.

BRIEF DESCRIPTION OF THE DRAWINGS

Further advantages will become apparent from the following description of the drawings. The drawings illustrate one exemplary embodiment of the disclosure.

The drawings show.

DETAILED DESCRIPTION

Figure 1A:
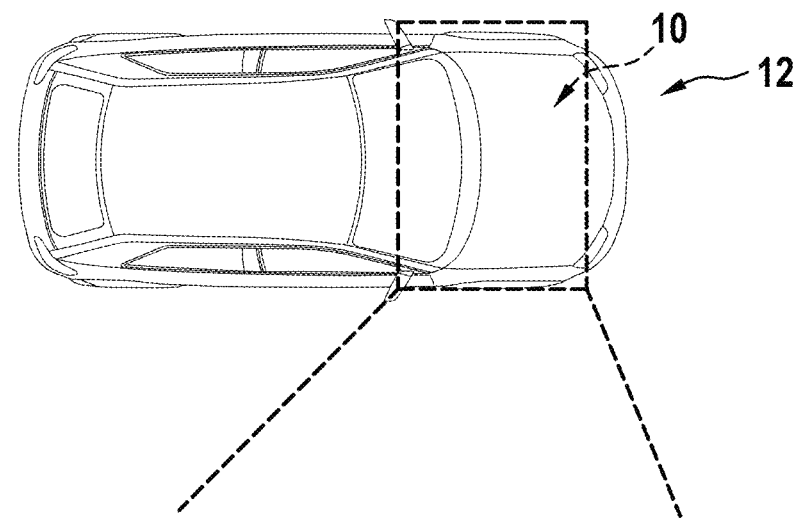
FIGS. 1*a-b* a vehicle with a steering system designed as a steer-by-wire steering system in a simplified representation, FIG. 2 example diagrams of various signals for operating the steering system and FIG. 3 an exemplary flow chart with main method steps of a method for operating the steering system.
Figure 1B:
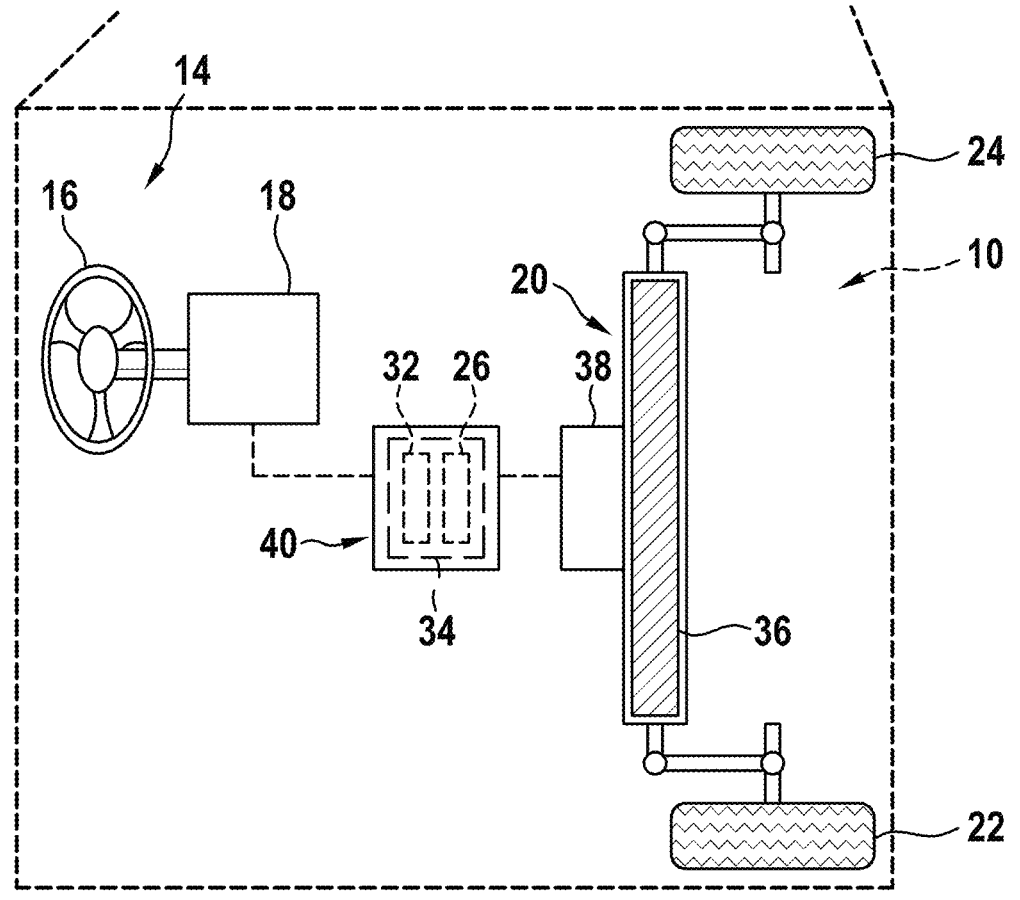

FIGS. 1*a* and 1*b* show a simplified illustration of a vehicle 12 which is, e.g., designed as a passenger vehicle comprising a plurality of vehicle wheels 22, 24 and a steering system 10. The steering system 10 is operatively connected to the vehicle wheels 22, 24, and is provided to influence a direction of travel of the vehicle 12. Furthermore, the steering system 10 is designed as a steer-by-wire steering system in the present case, in which a driver setpoint or steering input is transmitted electrically to the vehicle wheels 22, 24 in at least one operating state.

The steering system 10 comprises an operating unit 14, in particular actuatable by a driver and/or an occupant. The operating unit 14 comprises a steering handle 16 in the form of, e.g., a steering wheel, and a feedback actuator 18 which is in particular mechanically coupled to the steering handle 16. In the present case, the feedback actuator 18 is provided in a normal operating state at least for providing an active feedback torque and thereby for generating a steering feel, in particular in the form of a steering resistance and/or a restoring torque on the steering handle 16. To this end, the feedback actuator 18 comprises at least one electric motor (not shown) designed in particular as a permanently excited synchronous motor. Furthermore, the operating unit 14 is designed to be fail-operational, i.e. operationally safe with regard to an initial error. A steering handle could alternatively also be designed as a joystick, a steering lever, and/or as a steering ball or the like. A feedback actuator could further comprise a plurality of electric motors.

The steering system 10 further comprises a known wheel steering angle control element 20. The wheel steering angle control element 20 is mechanically separate from the operating unit 14. The wheel steering angle control element 20 is purely electrically connected to the operating unit 14. Further, the wheel steering angle control element 20 is designed, e.g., as a central regulator. The wheel steering angle control element 20 has an operative connection with at least two of the vehicle wheels 22, 24, in particular two front wheels, and is intended to convert the driver's setpoint or steering input into a steering movement of the vehicle wheels 22, 24. For this purpose, the wheel steering angle control element 20 comprises a steering regulator element 36, exemplarily designed as a gear rack, and a steering actuator 38 that interacts with the steering regulator element 36. In the present case, the steering actuator 38 comprises at least one further electric motor (not shown), designed in particular as a permanently excited synchronous motor, and is provided for controlling the steerable vehicle wheels 22, 24. A steering system could in principle basically also comprise a plurality of wheel steering angle control element, in particular designed as single-wheel controllers. Furthermore, a steering actuator could comprise a plurality of electric motors.

The vehicle 12 further comprises a control device 40. In the present case, the control device 40 is designed as a steering control device and is therefore part of the steering system 10. The control device 40 comprises an electrical connection to the wheel steering angle control element 20.

The control device 40 also has an electrical connection to the operating unit 14. The control device 40 is provided at least for controlling an operation of the steering system 10. In the present case, the control device 40 is intended to control the steering actuator 38 as a function of a signal from the operating unit 14, for example as a function of the driver's setpoint or steering input and/or a manual torque. The control device 40 can further be provided to actuate the feedback actuator 18 depending on a signal from the wheel steering angle control element 20.

The control device 40 comprises a computing unit 34 for this purpose. The computing unit 34 comprises at least one processor (not depicted), e.g. in the form of a microprocessor, and at least one operating memory (not depicted). The computing unit 34 also comprises at least one operating program stored in the operating memory and has at least one calculation routine, at least one determination routine, at least one evaluation routine, and at least one adaptation routine. In addition, the computing unit 34 in the present case comprises at least one monitoring function 26. A control device could in principle also be different from a steering control device and designed, e.g., as a single, central vehicle control device having a central computing unit. It is also conceivable to provide separate control devices and/or computing units for one wheel steering angle control element as well as one operating unit and communicatively interconnect them.

In addition, the vehicle 12 and/or the steering system 10 may comprise further components and/or assemblies not shown, such as an internal vehicle sensor system for detecting at least one vehicle variable, for example a yaw rate, an external sensor system, for example in the form of a camera system, and/or a navigation system known per se.

In the event of a malfunction and/or failure of the feedback actuator 18, under certain circumstances and/or in certain driving situations, such as when cornering, the sudden loss of the feedback torque when the feedback actuator 18 transitions to a passive and/or degraded state can lead to unintended steering movements at the steering handle 16, which are interpreted by the steering system 10 as a driver setpoint and/or steering input and can consequently lead to an undesired vehicle reaction. In this context, it is assumed that the passive behavior of the feedback actuator 18 with regard to torque feedback is sufficient to operate the vehicle 12 safely, and only the transition to the passive case can pose a challenge with regard to controllability. The reason for this is that the feedback torque normally decreases abruptly in the event of a corresponding malfunction and/or failure of the feedback actuator 18, as the inherent passive friction in the steering system 10 is significantly lower than the feedback torque in the normal operating state. Particularly when cornering, a sudden reduction in the feedback torque and consequently a counter-torque on the steering handle 16 can lead to safety-critical situations, as the driver can only readjust his holding force with a time delay due to his reaction time and therefore steers further into the bend than intended.

To avoid such safety-critical situations, a method for operating the steering system 10 is therefore proposed below. In the present case, the computing unit 34 is provided to perform the method and comprises for this purpose a computer program having corresponding program code means. Alternatively, however, a computing unit of a control device, associated with an operating unit, could also be intended for performing the method.

According to the disclosure, an operation of the operating unit 14 and/or the feedback actuator 18 is monitored by means of the monitoring function 26 and, in at least one operating state in which an initial error of the operating unit 14 is determined, a steering characteristic of the steering system 10 is changed by modifying, in a controlled manner, a steering feel by an operation of the feedback actuator 18 adapted to the initial error. Accordingly, a feedback torque provided by the feedback actuator 18 is modified in order to change the steering characteristics and thereby achieve feedback adapted to the initial error. In principle, however, the operating unit 14 could also comprise a means for modifying the steering feel that differs from the feedback actuator 18. In this case, the steering characteristics are changed by modifying the steering feel such that a steering behavior adapted to the initial error is provided and/or achieved in the operating state. The aim here is to prepare and/or condition a driver for a possible malfunction and/or a possible failure of the feedback actuator 18, so that the driver can adapt his general driving strategy and/or drive or steer more carefully.

Figure 2:
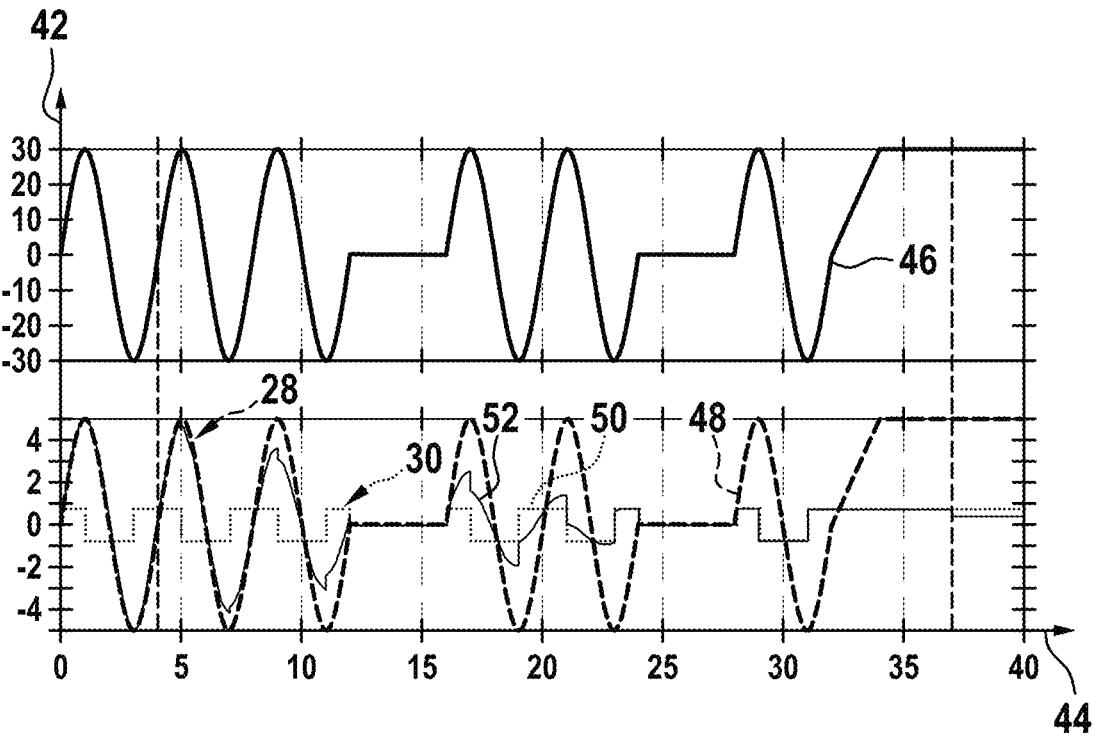

In the present case, the feedback actuator 18 is operated such that a change is made from a normal steering feel 28 to a modified steering feel 30, wherein the modified steering feel 30 provides feedback to the driver which lies between the normal steering feel 28 in the normal operating state and a passive steering feel without active feedback torque by the feedback actuator 18, i.e. a purely mechanical behavior (see in particular also FIG. 2). The normal steering feel 28 is characterized in particular by a restoring, a centering or a constant torque build-up in the straight-ahead position as well as a pronounced damping behavior known per se. Features of passive steering feel, on the other hand, include a very low torque level, which can in principle be identical to passive steering feel, a steering torque in the form of a friction torque, i.e. a torque that counteracts the direction of movement of the driver, no centering, the steering handle remaining in the position in which the steering handle is released, and very low damping based solely on mechanical properties.

In the present case, the modified steering feel 30 has a characteristic that is similar to and/or modeled on the passive steering feel. To this end, the modified steering feel 30 reproduces a characteristic corresponding to an inherent frictional behavior of the operating unit 14 and does not comprise a centering, so that the steering handle 16 remains in the position in which the steering handle 16 is released. This can instinctively signal to a driver that the functionality of the steering system 10, or more precisely the operating unit 14, is restricted and inform them that they should adjust their general driving strategy and/or drive or steer more carefully. In addition, a potential complete failure of the feedback actuator 18 can be mitigated by adjusting the feedback torque or the steering feel.

At the same time, however, a maximum torque level of the modified steering feel 30 is above a maximum torque level of the passive steering feel, which can increase operational safety in the operating state, in particular compared to a complete failure of the feedback actuator 18, as well as driving and/or steering comfort. In this context, the modified steering feel 30 can further emulate a, non-linear or linear, damping behavior of the operating unit 14, wherein the damping behavior can also be adapted depending on a steering speed of the steering handle 16 and/or a vehicle speed. The damping is preferably increased with increasing steering speed.

A change from the normal steering feel 28 to the modified steering feel 30 also takes place by means of a cross-fading and using a moving average. For this purpose, a fade factor is defined which initially has the value 0 and at the end of the cross-fading or the fade phase has the value 1. An actual steering feel is then obtained during the cross-fading or fade phase by superimposing normal steering feel 28 and modified steering feel 30 and taking the fade factor into account. In addition, the duration of the cross-fading can be varied as a function of an amplification factor, in particular an additional amplification factor, which makes it possible to cross-fade more quickly or less quickly from the normal steering feel 28 to the modified steering feel 30 depending on the situation. The duration of the cross-fading is advantageously at least 25 seconds. The aim here is to slowly change the behavior of the steering system 10 or the steering feel from a normal haptic feedback to a passive or purely mechanical haptic feedback and thereby prepare a driver for a possible malfunction and/or a possible failure of the feedback actuator 18.

An integrator 32 is also used for cross-fading. The integrator 32 is 0 and/or deactivated in the normal operating state and is only activated in the operating state by an error signal provided by the monitoring function 26. Consequently, the integrator 32 is only activated when an initial error of the operating unit 14 is determined. In this context, an integrator value of the integrator 32 is dependent on a torsion bar signal or a torsion bar torque and/or steering torque signal, wherein the integrator value only increases when the torsion bar signal or the torsion bar torque and/or steering torque signal exceeds a defined threshold value.

FIG. 2 shows exemplary diagrams of various signals for operating the steering system 10.

An ordinate axis 42 is designed as a size axis. A time is shown in [s] on an abscissa axis 44. A curve 46 shows a course of a deflection of the steering handle 16, in particular in the form of an actual steering wheel angle. A curve 48 shows a progression of the normal steering feel 28. A curve 50 shows a progression of the modified steering feel 30. A curve 52 shows an exemplary progression of the feedback torque actually provided by the feedback actuator 18.

FIG. 2 and in particular curve 52 show the slow or gradual change in the steering feel or feedback torque from the normal steering feel 28 to the modified steering feel 30. An initial error occurs at second 4. The feedback actuator 18 is then operated such that there is a gradual change to the modified steering feel 30. In the case shown, the modified steering feel 30 consists, for example, only of a friction behavior. The torque level is also very low, which means that the change in the feedback torque for the driver in the event of a possible second error or failure of the feedback actuator 18 is also only slight and the driver has no difficulty in controlling the driving situation, as the torque situation changes only slightly and there are no large excess torques that result in a significant steering movement in the event of a second error or failure of the feedback actuator 18. At second 37, for example, a corresponding second error occurs. In this case, the passive steering feel, which is not explicitly shown, has an exemplary value of 0.4 Nm, while the modified steering feel 30 has a value of 0.75 Nm. In this case, therefore, there is only a minimal change in the transition from the modified steering feel 30 to the passive steering feel. If, on the other hand, the difference between the normal steering feel 28 and the passive steering feel is considered, a value of 4.6 Nm is obtained as an example and therefore a significantly larger torque jump when the feedback actuator 18 fails.

Figure 3:
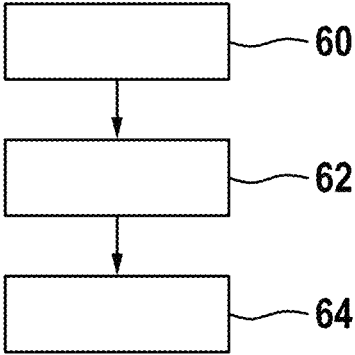

Finally, FIG. 3 shows an exemplary flow chart with the main process steps of the process for operating the steering system 10.

A process step 60 corresponds to a normal operating state, in particular an error-free state. In this case, the steering feel corresponds to a normal steering feel 28. In addition, operation of the operating unit 14 and/or the feedback actuator 18 is monitored by means of the monitoring function 26.

In a method step 62, an initial error of the operating unit 14 is determined by means of the monitoring function 26.

In a subsequent process step 64, a steering characteristic of the steering system 10 is changed by modifying, in a controlled manner, the steering feel, in particular by means of a feedback actuator 18 operation that is adapted to the initial error. For this purpose, the feedback torque provided by the feedback actuator 18 is changed such that there is a gradual transition from the normal steering feel 28 to a modified steering feel 30.

The exemplary flow chart in FIG. 3 is only intended to describe an exemplary method for operating the steering system 10. In particular, individual method steps can also vary, or additional method steps can be added. In this context, it is conceivable, for example, that a change to the modified steering feel 30 takes place by means of a corresponding cross-fading and, in particular, using a moving average.

The invention claimed is:

1. A method for operating a steering system of a vehicle, in which the steering system is designed as a steer-by-wire steering system and comprises (i) an operating unit with at least one steering handle and with at least one feedback actuator that interacts with the steering handle, and (ii) at least one wheel steering angle control element, which is operatively connected to the operating unit, for changing a steering angle of at least one vehicle wheel, the operating unit being at least partially fail-operational, the method comprising:

ascertaining an initial error of the operating unit; and changing a steering characteristic of the steering system, in at least one operating state in which the initial error of the operating unit is ascertained, by gradually modifying a steering feel of the at least one steering handle produced by the at least one feedback actuator in a controlled manner from a normal steering feel to a modified steering feel over a fade phase time period.

2. The method according to claim 1, wherein the gradual modifying of the steering feel includes using an integrator for cross-fading from the normal steering feel to the modified steering feel, said integrator being activated in the operating state by an error signal correlated with the initial error.

3. The method according to claim 1, wherein the fade phase time period is at least 10 s.

4. The method according to claim 1, wherein the modified steering feel provides feedback to a driver, said feedback being at least temporarily between the normal steering feel and a passive steering feel without an active feedback torque.

5. The method according to claim 1, wherein the modified steering feel has a characteristic which corresponds to a passive steering feel without active feedback torque by the feedback actuator.

6. The method according to claim 1, wherein the modified steering feel reproduces a characteristic corresponding to an inherent frictional behavior of the operating unit.

7. The method according to claim 1, wherein the modified steering feel does not simulate a centering of the steering handle.

8. The method according to claim 1, wherein a maximum torque level of the modified steering feel is above a maximum torque level of a passive steering feel without active feedback torque by the feedback actuator.

9. The method according to claim 1, wherein the modified steering feel simulates a damping behavior, the damping behavior being adapted based on a steering speed of the steering handle and/or a vehicle speed.

10. A computing unit comprising:

at least one operating memory; and at least one processor configured to execute program instructions stored in the at least one operating memory to carry out the method according to claim 1.

11. A steering system comprising:

the computing unit according to claim 10;

the operating unit, which comprises the at least one steering handle and the at least one feedback actuator that interacts with the steering handle; and the at least one wheel steering angle control element, which is operatively connected to the operating unit and is configured to control the steering angle of the at least one vehicle wheel.

12. A vehicle comprising:

the steering system according to claim 11.

13. The vehicle according to claim 12, wherein the vehicle is a motor vehicle.

14. The steering system according to claim 11, wherein the steering system is a steer-by-wire steering system in which the at least one wheel steering angle control element is mechanically separate from the at least one operating unit.

15. The method according to claim 1, wherein the gradual change from the normal steering feel to the modified steering feel takes place by using a moving average.

\* \* \* \* \*